(12) United States Patent
Dinant

(10) Patent No.: US 7,077,551 B2
(45) Date of Patent: Jul. 18, 2006

(54) TAMPER-INDICATING SECURITY CAP; SUCH A CAP IN COMBINATION WITH A MOTOR VEHICLE HEADLIGHT; AND A METHOD OF ADJUSTING THE HEADLIGHT

(75) Inventor: Franck Dinant, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/449,037

(22) Filed: May 29, 2003

(65) Prior Publication Data

US 2003/0223244 A1 Dec. 4, 2003

(30) Foreign Application Priority Data

May 31, 2002 (FR) .................................. 02 06757

(51) Int. Cl.
*F21V 7/00* (2006.01)
(52) U.S. Cl. ....................................... 362/515; 362/420
(58) Field of Classification Search ................ 362/514, 362/515, 420, 421, 422, 423, 424, 287, 418
See application file for complete search history.

(56) References Cited

U.S. PATENT DOCUMENTS

| 5,003,436 A | * | 3/1991 | Yamada et al. | ............. 362/515 |
|---|---|---|---|---|
| 5,197,799 A | * | 3/1993 | Dehaene | ...................... 362/420 |
| 5,365,415 A | * | 11/1994 | Schmitt et al. | ............. 362/530 |
| 5,381,317 A | * | 1/1995 | Schmitt et al. | ............. 362/515 |
| 5,446,631 A | * | 8/1995 | Chikada | ..................... 362/463 |
| 5,673,991 A | | 10/1997 | Eickhoff et al. | ............ 362/513 |

FOREIGN PATENT DOCUMENTS

FR 2352955 A 1/1978
FR 2591967 A 12/1985

* cited by examiner

*Primary Examiner*—John Anthony Ward
(74) *Attorney, Agent, or Firm*—Morgan & Finnegan, LLP

(57) ABSTRACT

An adjustable element is part of an apparatus such as an automotive headlight which includes a support, and a security cap prevents undetected interference with the adjustment of that element, guaranteeing its inviolability. The adjustment is effected with a control member rotatable about a geometrical axis transverse to the axis of the support. The control member has an adjusting head accessible from outside the support. The security cap is mounted for movement in translation with respect to the support, parallel to the geometric support axis, and includes snap-fitting means co-operating with a zone of the support, to be engaged in response to this movement. The cap is put into a final snap-fitted position, in which it conceals the adjusting head, by a simple push.

15 Claims, 3 Drawing Sheets

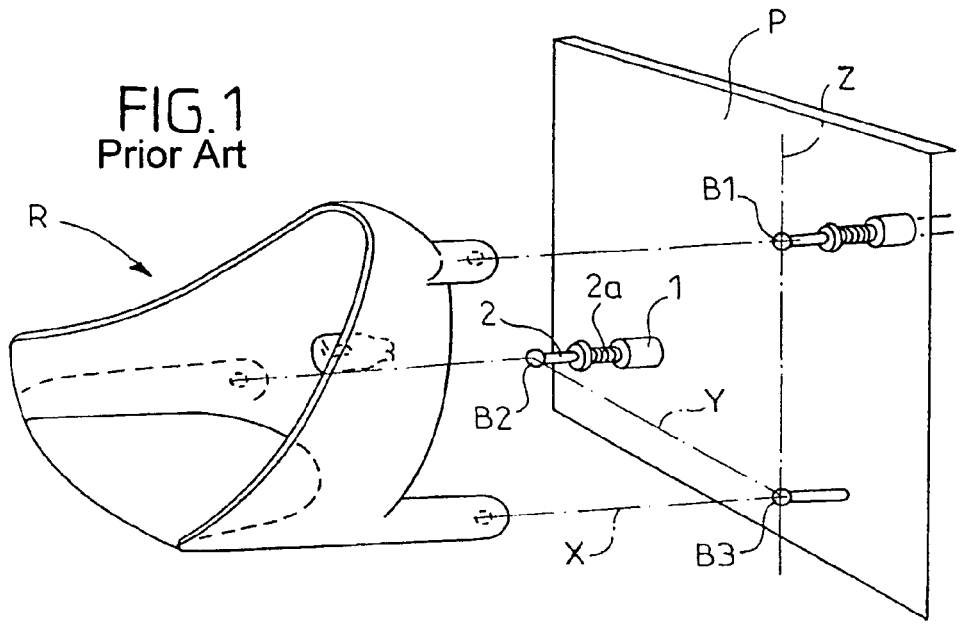
FIG. 1 Prior Art
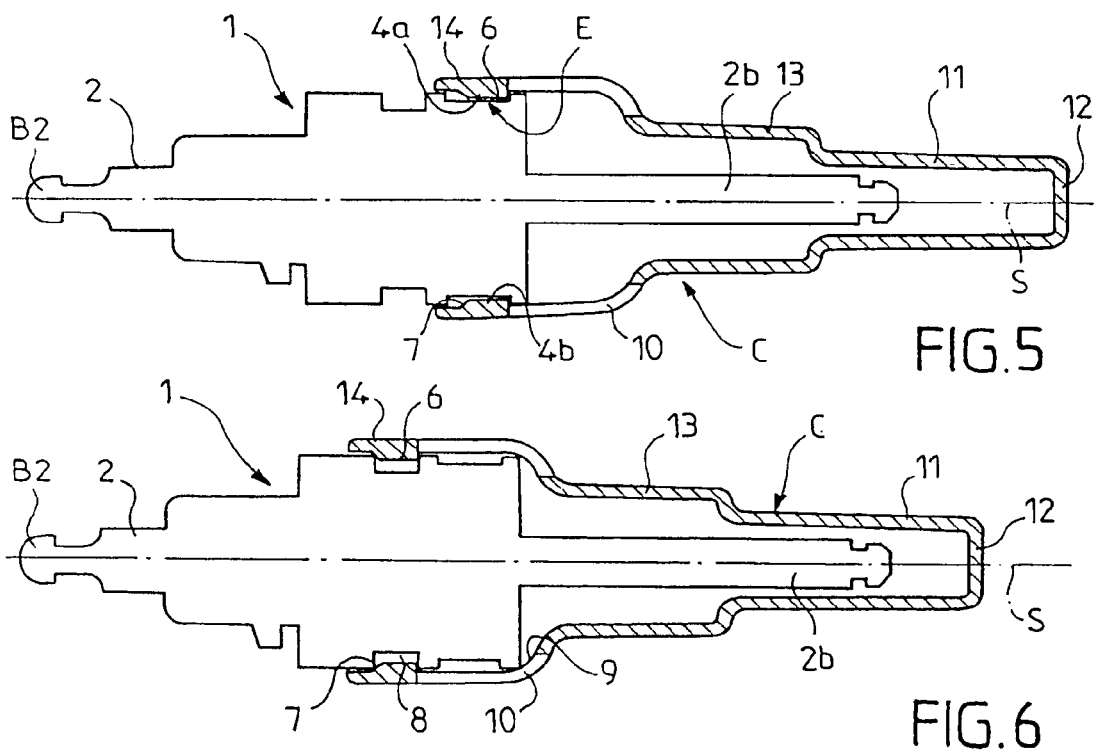
FIG. 5
FIG. 6

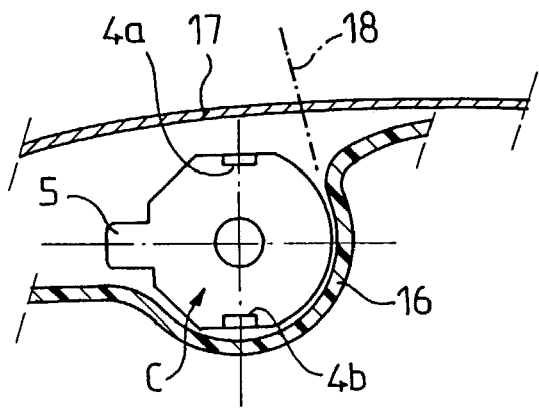
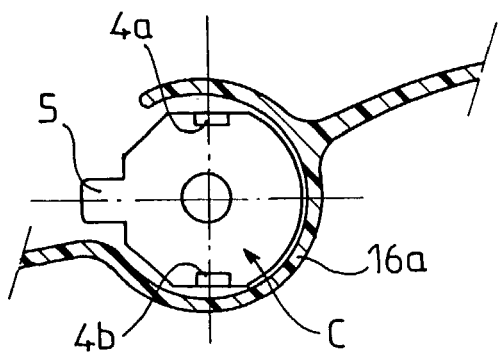
FIG.7  FIG.8
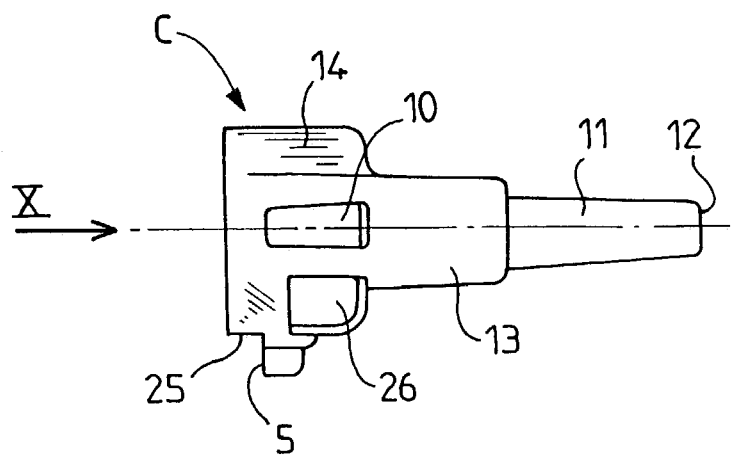
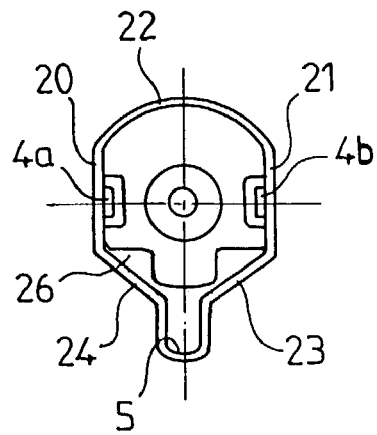
FIG.9  FIG.10

TAMPER-INDICATING SECURITY CAP; SUCH A CAP IN COMBINATION WITH A MOTOR VEHICLE HEADLIGHT; AND A METHOD OF ADJUSTING THE HEADLIGHT

FIELD OF THE INVENTION

This invention relates to a security cap for preventing undetected interference with the adjustment of the position of an element with respect to a support, where such adjustment is effected with the aid of a control member mounted for rotation about a geometric axis transverse to that of the support, the said control member comprising an adjusting head which is accessible from outside the support.

BACKGROUND OF THE INVENTION

Where, in an apparatus of any kind, an element of the apparatus having a major function has to be adjusted by a professional, it is desirable to prevent any subsequent interference with the adjustment by an unauthorised entity, at least without it being evident that such tampering has taken place.

In particular, a motor vehicle headlight calls for horizontal optical adjustment (that is to say adjustment in azimuth), in particular to avoid dazzling of the drivers of vehicles travelling in the opposite direction. This adjustment is carried out in the factory by the manufacturer, after the headlight has been fitted in the vehicle. The position of the optical beam is adjusted as a function of inaccuracies in the manufacture of the body of the vehicle.

In order to prevent unauthorised modification of the adjustment, it has in the past been proposed to put in place, on the head of the control member, an anti-removal cover which is engaged in a direction parallel to the geometric axis of rotation of the control member. Fitting of this cover is quite a delicate operation, because access to the head of the control member is generally difficult. Fitting the anti-removal cover in place takes some time, and has to be carried out on the production line of the vehicle. In addition, in some adjusting devices for headlights, a central rod or rod element projects towards the rear from the support and enables the adjustment to be modified. The anti-removal cover that covers the adjusting head does not prevent unauthorised action on this central rod element.

DISCUSSION OF THE INVENTION

A main object of the invention is to propose a tamper-indicating security cap which can be fitted in a simple and rapid manner. It will be of advantage if the cap is able to be installed beforehand in an intermediate position on the support of the element which is to be adjusted. Preferably, the cap should enable the adjusting device to be fully concealed, even if it does include a central rod element as discussed above.

According to the invention in a first aspect, a security cap for preventing undetected interference with the adjustment of the position of an element with respect to a support, where such adjustment is effected with the aid of a control member mounted for rotation about a geometric axis transverse to that of the support, the said control member comprising an adjusting head which is accessible from outside the support, is characterised in that the cap is arranged to be mounted for movement in translation with respect to the support in a direction parallel to the geometrical axis of the support, and in that the cap further includes snap-fitting means adapted to cooperate with a zone of the said support for engagement of the snap-fitting means in response to said movement in translation, the cap being further adapted so that, by simple pushing action, it can be put into a final snap-fitted position in which it conceals the said adjusting head.

Preferably, the cap is adapted to occupy an intermediate position on the said support, in which it allows free access to be gained to the head of the control member, the cap being adapted to be pushed from the intermediate position into the said snap-fitted final position. The cap is thus able to be delivered pre-installed on the support.

In particular, the cap is adapted to be pre-installed on the support.

The said snap-fitting means may comprise two opposed projecting lugs on the internal wall of the cap; it may include a shroud element in which the said adjusting head is able to be lodged after the cap has been snap-fitted in its final position, the shroud being arranged to project from the wall of the cap at equal distances from the two said lugs; the shroud may be open towards the said support so as to permit entry of the adjusting head during the said movement of the cap in translation.

The shroud may be disposed at the end of a radial extension projecting towards the said support. In another version, the cap has a transverse cross section comprising two opposed straight side walls, the said snap-fitting lugs being disposed on the inside of the said side walls, the side walls being joined together at one end thereof by an arcuate, outwardly convex, curved wall portion, and at their other end by respective wall segments which are themselves joined together by the said shroud, the shroud being situated at the base of a notch formed parallel with the axis of the cap.

The internal cross section of the cap may be larger than the cross section of a support, by an amount sufficiently large to enable the cap to be released from its snap-fitted engagement before the installation, in a vehicle, of a headlight that includes the said support. A rupturable abutment may be provided on the cap so as to prevent it being moved involuntarily from its intermediate position to its final position, this abutment being able to be torn away so that the cap can be put in its final position.

In another version, the internal cross section of the cap is close enough to the cross section of the support mounted within the cap to prevent the cap from being dislodged from its snap-fitted engagement without damage to the cap.

In the case where the support includes a central rod element extending it on the side opposite to the element which is to be adjusted, the cap includes a substantially cylindrical or frusto-conical first portion which is closed at one end and which is adapted to surround the central rod element and to isolate the latter from outside, the cap further including an intermediate portion and a further portion of larger cross section which includes the snap-fitting lugs and the shroud.

According to the invention in a second aspect, a cap according to the invention is provided in combination with a motor vehicle headlight, this combination being characterised in that the cap is pre-installed in an intermediate position on an adjusting device of the headlight, such that the cap allows free access to be obtained to the adjusting head of the control member in order to perform adjustment, the cap being able to be pushed, after adjustment has been carried out, into its final snap-fitted position.

The invention also provides a method of effecting optical adjustment of a motor vehicle headlight which is pre-equipped with a security cap according to the invention, the cap being in an intermediate position which enables adjustment of the headlight to be carried out when the latter is mounted in the vehicle. Therefore, according to the invention in a third aspect, in a method of performing optical adjustment of the headlight in a combination according to the invention in its second aspect set forth above, after the adjustment of the headlight has been carried out, axial pressure is exerted on the cap so as to put the cap in a final snap-fitted position in which all radial access to the adjusting head of the adjusting member is prevented.

Further features and advantages of the invention will appear more clearly on a reading of the following detailed description of some preferred embodiments of the invention, which are given by way of non-limiting example only and with reference to the accompanying drawings.

BRIEF DESCRIPTION OF THE DRAWINGS

FIG. 1 is a perspective view showing the adjustable mounting of a conventional automotive headlight.

FIG. 5 is a diagrammatic vertical cross section on a larger scale, partly in outline, the section being taken on the line V—V in FIG. 3.

FIG. 6, in a similar way to FIG. 5, is a diagrammatic cross section taken on the line VI—VI in FIG. 4.

FIG. 7 is a transverse cross section of a housing, with the cap being shown diagrammatically.

FIG. 8 shows, in a similar way to FIG. 7, another embodiment of the housing for the cap.

FIG. 9 is a top plan view of a further embodiment of the tamper-resistant cap.

FIG. 10 is a view in the direction of the arrow X in FIG. 9.

DESCRIPTION OF PREFERRED EMBODIMENTS OF THE INVENTION

Reference is first made to FIG. 1, which shows diagrammatically a reflector R which is part of a movable assembly of a motor vehicle headlight, or more generally of an automotive lighting or indicating apparatus.

The reflector R is maintained in position relative to the body P of the vehicle (which is shown symbolically in FIG. 1), at three points, by means of three capsules B1, B2 and B3. Each of these capsules generally consists of a spherical ball in cooperation with a corresponding housing formed in a lug which is fixed with respect to the rear wall of the reflector R. The two capsules B1 and B3 have their centres situated on an axis Z which is substantially vertical with respect to a headlight which is installed in a vehicle standing on horizontal ground. The capsules B2 and B3 have their centres situated on a substantially horizontal axis Y, which is substantially orthogonal to the plane defined by the axis Z and by an axis X which passes through the centre of the capsule B3 and parallel to the longitudinal axis of the vehicle. The capsule B3 is fixed with respect to the vehicle body P.

The capsule B2 is able to be displaced parallel to the axis X and in relation to the bodywork P. Adjustment is carried out in the factory and enables the azimuth of the light beam, that is to say the angle made between the mean vertical longitudinal plane of the beam and the direction of the longitudinal axis of the vehicle, to be adjusted.

Figure 2:
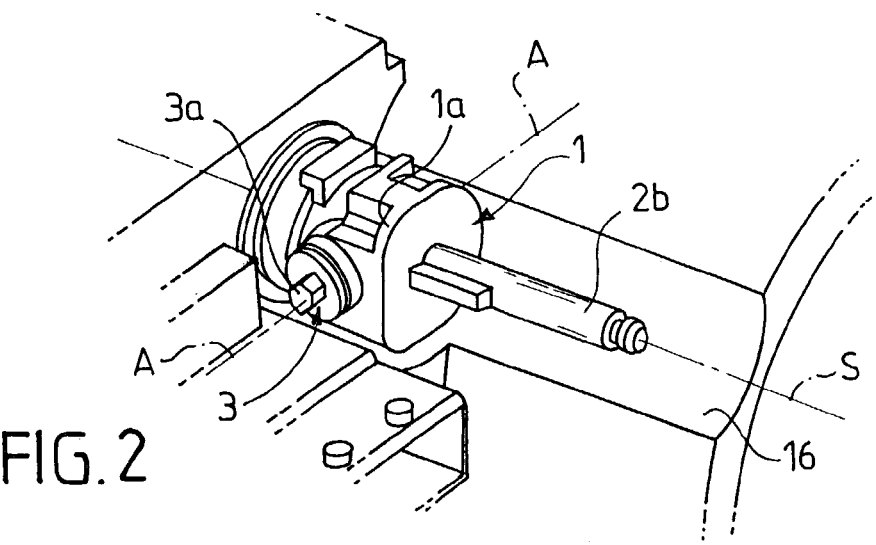
FIG. 2 is a partial rear view, in perspective, of the azimuth adjusting device for a headlight installed in a motor vehicle.

Capsule B2 constitutes an element the position of which can be adjusted in relation to a support 1 which is fixed to the body P of the vehicle. Capsule B2 is mounted at the end of a rod 2 which is oriented parallel to the axis X, and has a threaded zone 2a which is received in the support 1. The threaded zone 2a co-operates with a threaded bore (not visible) of the fixed support 1. The rod 2 is extended on the side away from the capsule B2 by a central rod element 2b (see FIG. 2 and FIGS. 5 and 6).

An adjusting member 3 (FIGS. 2 and 3) for controlling adjustment of the capsule B2 is mounted for rotation in the support 1 about a transverse geometrical axis A. In the example under consideration, the axis A is orthogonal to the geometrical axis S of the support 1. The member 3 has a head 3a, which is hexagonal in this particular example and which is accessible from outside the support. The head 3a can be rotated using an appropriate tool, for example a key or spanner. A system of meshing elements (not visible) is arranged in the support 1 for transmitting the rotary motion of the head 3a to the rod 2 which, by screwing or unscrewing in the fixed bore of the support 1, can be displaced axially. The rod 2 is mounted for free relative translational movement with respect to the support 1 and with respect to the system of meshing elements which rotate it.

A security cap C can be seen in FIGS. 3 to 6. This cap is preferably made of moulded plastics material and is provided for the purpose of guaranteeing that the adjustment of the capsule B2, once made, is inviolable, that is to say it cannot be tampered with without such interference being evident.

The cap C is arranged to be mounted for movement in translation relative to the support 1 and parallel to the geometric axis S of the support.

The cap C includes snap-fitting means E (see FIG. 5), which preferably consists of two lugs 4a and 4b which project radially inwards on the inner wall of the cap C. The lugs 4a and 4b are diametrically opposed to each other. A shroud 5, in which the adjusting head 3a can be contained, is formed on the wall of the cap C, at an equal distance from each of the two lugs.

Figure 3:
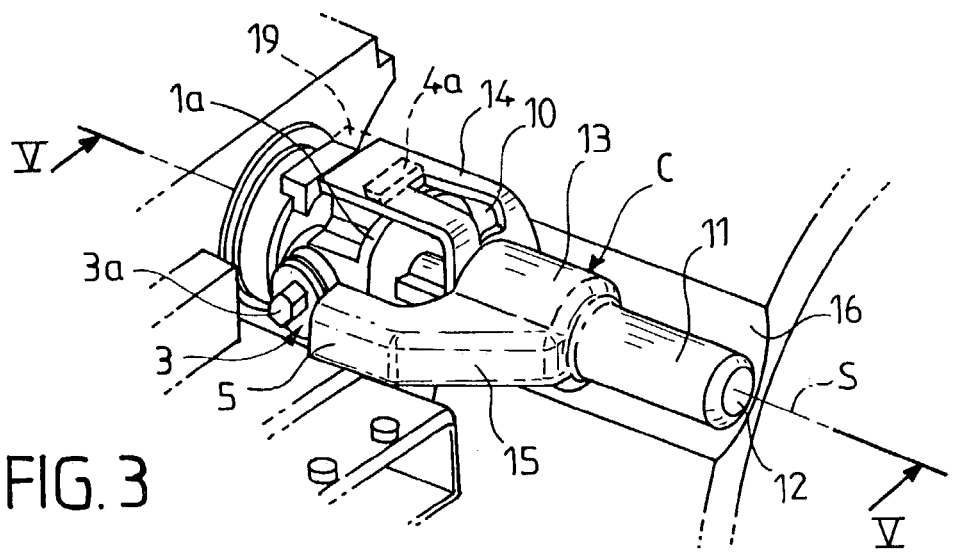
FIG. 3 shows, in a similar manner to FIG. 2, the adjusting device when equipped with a security cap according to the invention, which is shown in an intermediate position.

The cap C is able to occupy an intermediate position shown in FIG. 3, in which it leaves access free to the adjusting head 3a, for the purpose of making adjustments. In this position, a releasable snap-fitting engagement is ensured between the lugs 4a, 4b and a zone of the support 1 which defines a groove 6 (see FIG. 5). The groove 6 has an axial length greater than that of the lug. The edge 7 of the lug which faces towards the capsule B2 is inclined on the axis S so as to be divergent from the latter going towards the capsule B2. The edge 7 thus constitutes an inclined ramp which enables the edge of the groove 6 to be deflected towards the capsule B2 under the action of pressure exerted on the cap C.

Figure 4:
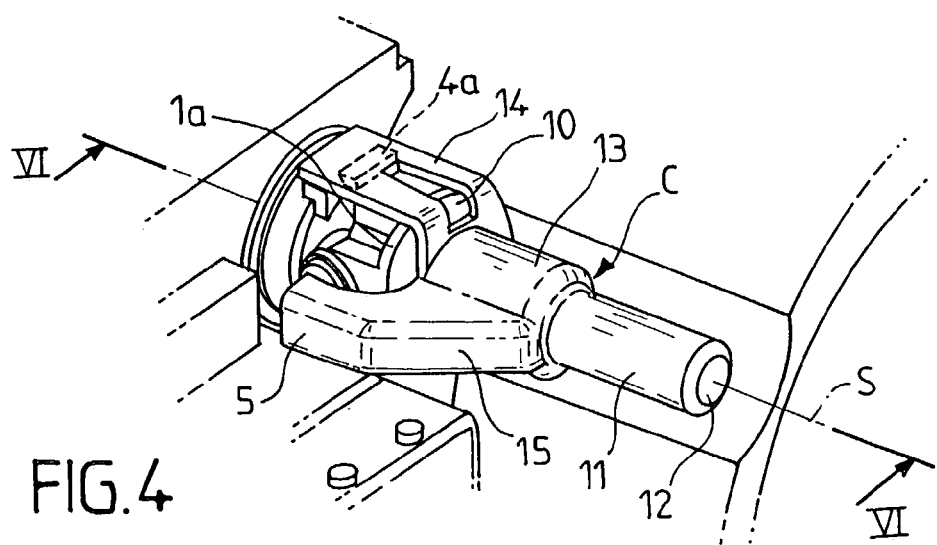
FIG. 4 shows, in a similar manner to FIG. 3, the adjusting device with the tamper-resistant security cap pushed into its final snap-fitted position.

The final snap-fitting position, in which the adjusting head 3a is covered by the cap C and lodged within the shroud 5, is shown in FIGS. 4 and 6. FIG. 6 shows that the cap C is displaced towards the capsule B2 and that the lugs 4a and 4b are received in a corresponding groove 8 of the support 1. The edge of the lug remote from the capsule B2 is in abutment against the edge of the groove 8, and prevents reverse movement of the cap C. Displacement towards the capsule B2 is prevented by a convergent zone 9 of the cap C coming into abutment against the rear part of the support 1.

The wall of the cap C may also have longitudinal apertures 10 which give it some degree of flexibility to facilitate the snap-fit.

The cap C comprises a first portion which is substantially cylindrical or slightly frusto-conical, and which is closed at its end 12 remote from the capsule B2. This portion 11 is arranged to surround the central rod element 2b and to prevent the rod element 2b from being manoeuvred in such a way as to modify the adjustment of the capsule B2. An intermediate portion 13 of larger diameter joins the portion 11 to a front portion 14, which has an even larger cross section and which surrounds the support 1. The intermediate portion 13 surrounds part of the central rod element 2b.

In the embodiment shown in FIGS. 3 and 4, the shroud 5 is situated at the end of a radial extension 15 which is fixed with respect to the intermediate portion 13, and which projects towards the capsule B2.

Adjustment of the headlight, and use of the cap C, are as follows.

The headlight is delivered already equipped with the cap C installed on the azimuth adjustment support 1 in the intermediate position shown in FIG. 3. After the headlight has been fitted in the vehicle, as shown in FIG. 3, the operator can adjust the head 3a so as to adjust the azimuth angle of the light beam of the headlight, thereby compensating for any manufacturing errors or variations in the vehicle body and/or in the mounting of the headlight.

Once this adjustment has been carried out, the operator merely needs to push the cap C into the snap-fitted position shown in FIG. 4, so that the adjusting head 3a is then lodged within the shroud 5 and concealed by the cap C.

Since the adjusting head 3a is now no longer accessible, it is no longer possible to modify the adjustment without damaging the cap, which is easily detectable. The rod element 2b is completely enclosed, so that modification of the adjustment by interfering with this rod element is also not possible.

Generally, and as shown in FIG. 7, the cap C snap-fitted in its final position lies in a housing which is delimited by walls or bulkheads such as those indicated at 16 and 17, which radially surround the cap. In order to release the snap-fitting engagement of the cap C without damaging it, it would be necessary to introduce a tool 18 (shown diagrammatically) into the zone lying between the cap C and the wall 16, so as to move the lugs 4a and 4b apart. The wall 17 prevents the tool 18 being introduced, so that the cap C is effectively incapable of being removed without being damaged.

Reference is now made to FIG. 8, which shows a modification in which a housing wall 16a envelops the cap C by the greatest possible amount, and prevents any action which would tend to deform the cap C with a view to disengaging its snap-fit.

The internal cross section of the aperture in the cap C is preferably greater than the cross section of the support 1, so as to enable the cap C to be disengaged from its snap-fit when the headlight is no longer installed in the vehicle. For example, a clearance of 2 or 3 millimetres is provided between the inner surface of the cap and the outer surface of the support 1. With a cap C installed beforehand in an intermediate position on the support 1, it is possible, in the course of handling or transport, that the cap C is involuntarily pushed into the final snap-fitting position, even though the headlight has not yet been fitted on the vehicle. The possibility of disengaging the snap-fit at this stage enables the cap C to be put back in its intermediate position without damaging it, before the headlight is fitted in place.

It is possible to provide, within the zone 19 (FIG. 3) situated between the front edge of the cap C and a transverse surface of the support 1, a rupturable abutment element (not shown) fixed with respect to the cap C and preventing the latter from being put in its final position. It would be convenient to tear this abutment (which constitutes a security feature) in order that the cap C can then be pushed from its intermediate position into its final position after the adjustment has been carried out.

It would also be possible to provide a cap C in which its internal cross section would be matched to the support 1 in such a way as to prevent any non-destructive release of the snap-fit. In that case, if the cap were inadvertently pushed from its intermediate position to its final position before installation in the vehicle and adjustment of the azimuth angle, it would be necessary to destroy the cap and replace it with another one.

Reference is now made to FIGS. 9 and 10, which show a modified embodiment of the cap C in which the transverse cross section has two parallel and opposed straight sides 20 and 21 which correspond to two flat wall portions. The snap-fitting lugs 4a and 4b are arranged on the inside of the respective side walls 20 and 21. The walls 20 and 21 are joined together at one end by a wall portion 22 which is outwardly convex in the form of an arc of a circle. At their other end, the side walls 20 and 21 are joined through segments 24 and 23 respectively to the shroud 5, which lies axially behind a notch 25 parallel to the axis of the cap. The notch 25 enables free radial access to be obtained to the adjusting head 3a when the cap C is in its intermediate position.

Windows 26 are formed in the wall of the cap C, in the transition zone between the front portion 14 and intermediate portion 13. Corners 1a (FIGS. 2 to 4) of the rear wall of the support 1 can lodge within the windows 26. The form of the internal cross section of the cap C is such that it is able to be engaged only in the appropriate position on the support 1.

Whatever embodiment is adopted, the cap C is easy to put in its final position by simple pressure, after adjustment has been carried out. Since the headlight is delivered with the cap installed in an intermediate position, operations on the production line are simplified.

The adjusting device is entirely enclosed within the cap, so that it is impossible to modify the adjustment in a way that cannot be detected.

Although the above description has been given in relation to azimuth adjustment of an optical headlight, it will be clear that the tamper-indicating cap can serve for adjustments other than those of azimuth, and that it is applicable to adjusting devices other than those of optical headlights for motor vehicles.

What is claimed is:

1. A security cap for preventing undetected interference with the adjustment of the position of an element with respect to a support by means of a control member comprising an adjusting head accessible from outside the support, wherein the cap is arranged to be mounted for movement in translation with respect to the support in a direction parallel to a geometrical axis of the support, and wherein the cap further includes snap-fitting means adapted to cooperate with a zone of said support for engagement of the snap-fitting means in response to said movement in translation, the cap being further adapted so that, by simple pushing action, it can be put into a final snap-fitted position in which it conceals said adjusting head and prevents undetected interference with the adjustment of the control member.

2. A cap according to claim 1, adapted to occupy an intermediate position on the said support, in which intermediate position the cap allows free access to be gained to the head of the control member, the cap being adapted to be pushed from the intermediate position into the said snap-fitted final position.

3. A cap according to claim 1, adapted to be pre-installed on the support.

4. A cap according to claim 3, arranged to be pre-installed on an azimuth adjusting device of a motor vehicle headlight.

5. A cap according to claim 1, wherein the said snap-fitting means comprise two opposed projecting lugs on the internal wall of the cap.

6. A cap according to claim 5, further including a shroud element in which the said adjusting head is able to be lodged after the cap has been snap-fitted in its final position, the shroud being arranged to project from the wall of the cap at equal distances from the two said lugs, the shroud being open towards the said support so as to permit entry of the adjusting head during the said movement of the cap in translation.

7. A cap according to claim 5, wherein the shroud is disposed at the end of a radial extension projecting towards the said support.

8. A cap according to claim 5, having a transverse cross section comprising two opposed straight side walls, the said snap-fitting lugs being disposed on the inside of the said side walls, the side walls being joined together at one end thereof by an arcuate, outwardly convex, curved wall portion, and at their other end by respective wall segments which are themselves joined together by the said shroud, the shroud being situated at the base of a notch formed parallel with the axis of the cap.

9. A cap according to claim 1, wherein the internal cross section of the cap is larger than the cross section of a support, by an amount sufficiently large to enable the cap to be released from its snap-fitted engagement before the installation, in a vehicle, of a headlight that includes the said support.

10. A cap according to claim 1, for a said support which includes a central rod element which is extended on the side opposite to the said element to be adjusted, wherein the cap comprises a substantially cylindrical or frusto-conical first portion closed at one end and adapted to surround the said central rod element and to isolate the latter from outside, the cap further comprising an intermediate portion and a further portion which has a larger cross section and which includes snap-fitting lugs.

11. A cap according to claim 1 in combination with a motor vehicle headlight, wherein the cap is pre-installed in an intermediate position on an adjusting device of the headlight, such that the cap allows free access to be obtained to the adjusting head of the control member in order to perform adjustment, the cap being able to be pushed, after adjustment has been carried out, into its final snap-fitted position.

12. The combination of claim 11, wherein the cap is pre-installed in an intermediate position on the horizontal adjusting device of the headlight.

13. The combination of claim 11, wherein the internal cross section of the cap is greater than the cross section of the support of the adjusting device, by an amount sufficient to enable the cap before the headlight is installed in the vehicle, to be disengaged from its snap-fitted position, and returned from its final position to its intermediate position without damage to the cap.

14. The combination of claim 11, wherein the said support of the adjusting device includes a central rod element which is extended on the side away from the element to be adjusted, and wherein the cap comprises a substantially cylindrical or frusto-conical first portion closed at one end and adapted to surround the said central rod element and to isolate the latter from outside, the cap further including an intermediate portion and a further portion of larger cross section which includes snap-fitting lugs.

15. A method of performing optical adjustment of the headlight in a combination according to claim 11, wherein, after the adjustment of the headlight has been carried out, axial pressure is exerted on the cap so as to put the cap in a final snap-fitted position in which all radial access to the adjusting head of the adjusting member is prevented.

* * * * *